US006038323A

United States Patent [19]

Petroff

[11] Patent Number: 6,038,323

[45] Date of Patent: Mar. 14, 2000

[54] STEREOPHONIC IMAGE ENHANCEMENT SYSTEM FOR USE IN AUTOMOBILES

[75] Inventor: Michael L. Petroff, West Hills, Calif.

[73] Assignee: Harman Motive Inc., Martinsville, Ind.

[21] Appl. No.: 08/971,779

[22] Filed: Nov. 17, 1997

[51] Int. Cl.[7] .......... H04M 5/00

[52] U.S. Cl. .......... 381/1; 381/17; 381/27; 381/86

[58] Field of Search .......... 381/86, 1, 27, 381/17

[56] References Cited

U.S. PATENT DOCUMENTS 4,024,344 5/1977 Dolby et al. .......... 381/27
4,408,095 10/1983 Ariga et al. .......... 381/27
4,817,162 3/1989 Kihara .......... 381/1

*Primary Examiner*—Forester W. Isen
*Assistant Examiner*—Wade H. Toubassi
*Attorney, Agent, or Firm*—J. E. McTaggart

[57] ABSTRACT

A stereophonic image enhancement signal processing system for vehicular sound systems provides a symmetrical improvement in imaging for listeners located at the left and right regions of a vehicle passenger compartment The stereo signals are processed in a manner to provide a rapid rate-of-change of phase equal to at least 90 degrees per octave approaching a maximum of 180 degrees between the stereo channels at approximately 300 Hz. A further enhancement of the reproduced sound stage is provided through the application of equalized stereo difference signals prior to, and in combination with, the above described phase shift process. An optional center channel signal, summed from stereo source signals, may be provided for driving a central speaker.

8 Claims, 5 Drawing Sheets

STEREOPHONIC IMAGE ENHANCEMENT SYSTEM FOR USE IN AUTOMOBILES

FIELD OF THE INVENTION

This invention relates to stereophonic sound reproduction in vehicles and more specifically to audio signal processing for symmetrically enhancing the perceived image focus and sound stage for listeners located at the left and right passenger locations of an automobile.

BACKGROUND OF THE INVENTION

An acoustic characteristic common to virtually all automotive sound systems is a rapid rate-of-change of interaural phase difference (IPD) typically equal to at least 90 degrees per octave to a maximum of 180 degrees at approximately 300 Hz as measured at the left and right side seat positions. The above described 180 degree maximum phase shift occurs over a "narrow-band region" between 150 Hz and 300 Hz therefore having a bandwidth on the order of 150 Hz. The above IPD anomaly constitutes a non-linear phase shift, as opposed to a linear phase shift or constant time delay that would be expected due to the difference in distances between each stereo speaker and a listener located at either the left or right side seat position.

The IPD occurring over such narrow-band region undergoes increasing phase lag as function of frequency at one side of a vehicle and undergoes increasing phase lead as function of frequency at the opposite side of the same vehicle. It should be noted, however, that IPD, in terms of phase correlation, remains nominally one at frequencies below such narrow-band region at both sides of such vehicle, and remains nominally minus one for frequencies above such narrow-band region up to approximately 1,000 Hz at both sides of the vehicle. The phase correlation is not predictable and therefore essentially zero at both sides of the vehicle above approximately 1,000 Hz due to acoustic reflections and standing waves; however, human hearing is not sensitive to IPD or phase correlation at and above 1,000 Hz. It follows that a signal process that provides a rapid rate-of-change of phase to a maximum of approximately 180 degrees between the stereo channels in the above described narrow band region introduces a correlation correction coefficient of plus one at frequencies below 150 Hz and minus one at frequencies above 300 Hz. When such correction coefficient is multiplied by the uncompensated phase correlations occurring at each side of the vehicle, the resulting corrected phase correlation at one side of the vehicle equals approximately one for all frequencies below 1,000 Hz, and the resulting corrected phase correlation at the opposite side of the vehicle equals approximately one for all frequencies below 1,000 Hz exclusive of the narrow-band region. Since the narrow-band region occupies a bandwidth of approximately 150 Hz, the percentage of non-corrected bandwidth relative to the corrected bandwidth in the phase sensitive region between 100 Hz and 1,000 Hz at such opposite side of the vehicle equals less than 17 percent, which is generally inaudible in terms of effect upon stereophonic imaging. It follows that the above signal process of the present invention provides substantially improved imaging at both sides of a vehicle simultaneously.

DISCUSSION OF RELATED KNOWN ART

U.S. Pat. No. 4,817,162 by Kihara teaches the use of a first phase shifter circuit at approximately 200 Hz in one stereo channel and a second phase shifter circuit at approximately 600 Hz in the remaining channel to provide a 180 degree maximum phase shift between 200 and 600 Hz. The resulting rate-of-change of phase shift in the 150 Hz to 300 Hz region, however, is limited by such first phase shifter circuit and consequently fails to meet the previously described rapid rate-of-change of phase shift objective of the present invention.

Similarly, U.S. Pat. No. 5,400,405 by Petroff teaches the use of a cascaded series of summed non-inverting low-pass and inverting high-pass filters, each having a cut-off frequency at approximately 300 Hz, wherein such cascaded filters operate in one stereo channel to provide 180 degree phase shift between the stereo channels at approximately 300 Hz. The resulting rate-of-change of phase shift, however, does not in practice increase commensurately with an increase in the "order" of such filters, due to the phase characteristics of higher than first-order filters, unless a substantial frequency separation is provided between the cut-off frequencies of such low-pass and high-pass filters which results in an undesirable dip in the amplitude response of such summed signal. Consequently, such circuitry fails to meet the previously described objective of the present invention unless aligned in a manner to introduce an undesirable dip in amplitude response.

OBJECTS OF THE INVENTION

A primary object of the present invention is to provide a stereo signal processor that produces a rapid rate-of-change of phase shift between the stereo channels of an automotive sound system of at least 90 degrees per octave to a maximum of 180 degrees at approximately 300 Hz.

An additional object of the present invention is to provide signal processing circuitry that inserts, in the signal path of one stereo channel, summed third-order low-pass and third-order high-pass filters each having nominally equal cut-off frequencies in a lower-midrange region in which the outputs of such filters are in-phase; and, to provide signal processing circuitry that inserts, in the signal path of the remaining stereo channel, a first-order phase shifter.

Another object of the present invention is to provide signal processing circuitry that includes summed low-pass and high-pass filters of orders n and n' correspondingly, such summed filters having nominally equal cut-off frequencies in a lower midrange region and inserted in one stereo signal path; and, a phase shifter of an order n" inserted in the remaining stereo signal path of an automotive sound system.

Still another object of the present invention is to provide signal processing circuitry that enhances stereophonic difference signal information in left and right signals applied to the left and right inputs respectively of a circuit that implements summed filter and the phase shift functions of the present invention.

Yet another object of the present invention is to provide signal processing circuitry that derives an L+R summed stereo source signal, preferably processed through a low-order high-pass filter having a cut-off frequency substantially above 500 Hz, and applies the derived sum signal to a center speaker operating combinationally with left and right speakers driven by signals provided by the signal processes of the present invention.

SUMMARY OF THE INVENTION

The present invention accomplishes an improvement in perceived stereo imaging in automobiles by providing a rapid rate-of-change of phase equal to at least 90 degrees per octave to a maximum of nominally 180 degrees at approximately 300 Hz between the stereo channels of the automotive sound system. The improved stereo imaging is thus provided in a symmetrical manner for listeners located at the left and right seat positions of an automobile or other vehicle.

In the preferred embodiment of the present invention, summed third-order low-pass and third-order high-pass filters each having nominally equal cut-off frequencies in a lower midrange region, in which such filters are added in-phase, constitute a summed filter network having a rapid rate of change 360 degree maximum phase shift. The summed filter network operates in one stereo channel, and a first-order phase shifter providing a 180 degree maximum phase shift between the stereo channels operates in the remaining stereo channel. The rapid rate-of-change of phase shift between the stereo channels is provided by the above described summed filter network; however, maximum differential phase shift between the stereo channels is limited by the first order phase shifter to nominally 180 degrees occurring at approximately 300 Hz, thereby fulfilling each of the previously described objectives. Such third-order filters may be substituted by alternative order filters and added in-phase or out-of-phase, and such first-order phase shifter may be substituted by a higher than first-order phase shifter function, without deviating from the principles taught by the present invention.

In practice, the above described first order phase shifter operating in one channel may be eliminated without affecting the essential principles of the present invention. This is the case because the rapid rate-of-change filter network operating in the opposite channel may be adjusted to compensate for the absence of the first order phase shifter in such a manner as to provide a rapid rate of change in the first 180 degrees of phase shift between the stereo channels at approximately 400 Hz. Under such circumstances, the rapid rate of change of phase shift between the stereo channels progresses beyond 180 degrees to a maximum of 360 degrees at upper-midrange frequencies approaching 1,000 Hz, however, IPD at upper mid-range frequencies is less critical to stereophonic imaging than IPD at and below 300 Hz, and thus it remains that a significant improvement in stereophonic imaging is provided at both sides of the vehicle.

Another feature of the present invention is a means for deriving equalized stereo difference signals a(L−R) and a(R−L), in which "a" represents a transfer function having an attenuation above a midrange frequency; a means for deriving an L+a(L−R) enhanced left signal that is applied to the left channel input of a circuit providing the above described phase shift function of the present invention; and, a means for deriving an R+a(R−L) enhanced right signal that is applied to the right channel input of such circuit. The use of such difference-conditioned left and right signals in combination with such phase-conditioning enhances the perceived spatial qualities of the reproduced music in an automotive listening environment.

A selection switch may be provided in a system embodying the present invention whereby such difference-conditioned left and right signals may be selected as the left and right channel outputs of such system, thereby by-passing the above described phase-conditioning function of the present invention, for the purpose of selectably providing difference signed enhanced stereo reproduction at all listening positions including the center position equidistant from the stereo speakers where such phase-conditioning function would serve to degrade rather than improve stereophonic imaging. In the alternative switched position, difference-signal-enhanced reproduction is provided by rear stereo speakers thus creating a concert hall ambience effect perceived by listeners located throughout the vehicle.

The particular difference-conditioning circuit described in the present invention is a modified version of that disclosed by the present inventor in U.S. Pat. No. 5,400,405; however, such circuit may be substituted by other difference signal enhancement circuits, in which derived equalized difference signals are mixed in an out-of-phase manner with the stereo source signals for ambience enhancement, without altering the concepts and principles of the present invention.

Yet another feature of the present invention is the use of a center channel speaker driven by a center channel signal in combination with a circuit providing the above described signal processes of the present invention, in which such center channel signal consists of an L+R stereo sum signal derived by a summing circuit. It is preferred that such L+R stereo sum signal is further processed by a low-order high-pass filter having a cut-off frequency substantially above 500 Hz.

The above described signal processes of the present invention may be implemented by functionally equivalent analog and DSP circuits, which, due to their equivalence, conform to the principles taught by the present invention. In particular, digital circuitry may be used to implement the present invention by providing a rate-of-change of phase equal to at least 90 degrees per octave to a maximum of approximately 180 degrees between the stereo channels at a midrange frequency of approximately 300 Hz; and, may further be used to implement the present invention by providing equalized stereo difference signals, in the manner described above, prior to and in combination with the above described phase shift function of the present invention. The application of a portion of such phase shift function to one stereo channel and the remaining portion of the phase shift function to the remaining channel, such that the above described shift function exists differentially between the stereo channels, is functionally equivalent to such phase shift function applied to one stereo channel only and therefore conforms to the principles taught by the present invention.

BRIEF DESCRIPTION OF THE DRAWINGS

The objects and advantages of the present invention will be more fully understood from the following description taken with the accompanying drawings in which:

FIGS. 4A–5A are graphs representing a conversion of corrected interaural phase difference for a listener in an automobile at the left side seat position (FIG. 4) and the right seat position (FIG. 5) respectively, to corrected phase correlation, measured at the right ear relative to the left ear, for the listener.

DETAILED DESCRIPTION OF THE DRAWINGS

Figure 1:
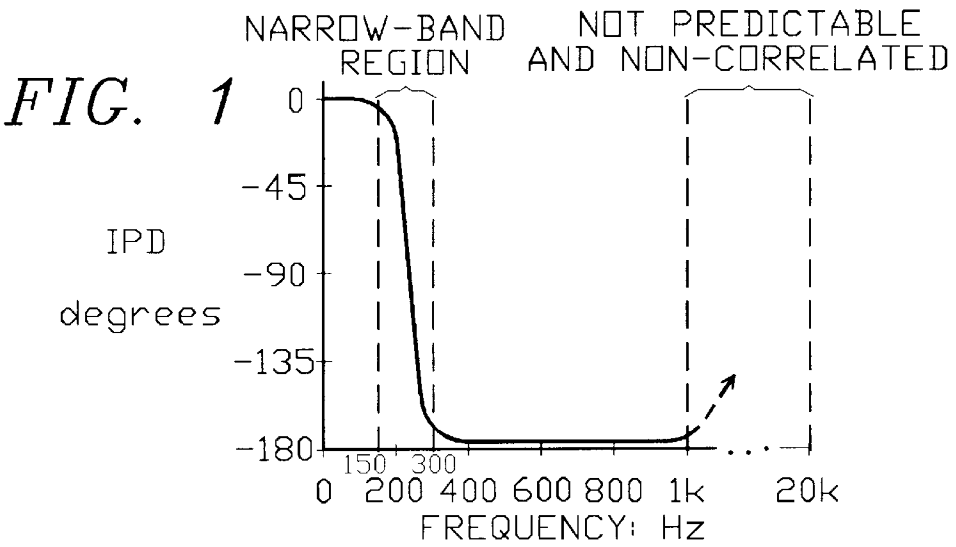
FIGS. 1–2 are graphs approximating uncorrected interaural phase differences as measured at the left and right seat positions respectively in an automobile.

FIG. 1 is a graph approximating the uncorrected interaural phase difference, measured at the right ear relative to the left ear, for a listener in an automobile at the left side seat position.

Figure 2:
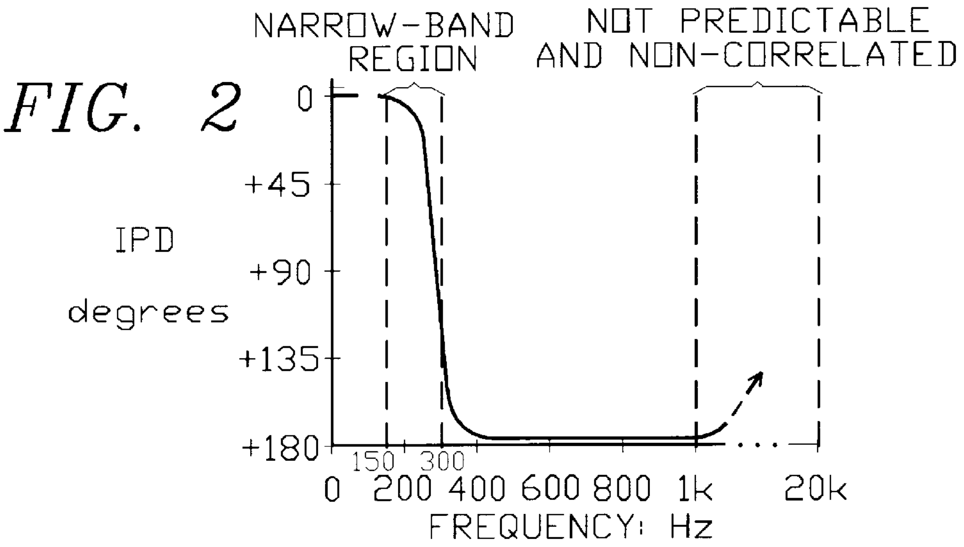

FIG. 2 is a graph approximating the uncorrected interaural phase difference, measured at the right ear relative to the left ear, for a listener in an automobile at the right side seat position.

Figure 3:
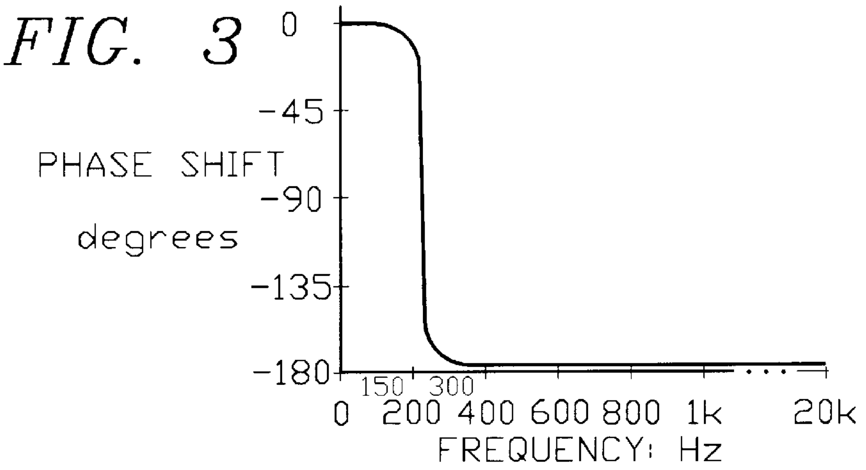
FIG. 3 is a graph approximating the correcting phase shift function provided by the signal processes of the present invention.

FIG. 3 is a graph approximating the correcting phase shift function of the present invention as measured at the left channel output signal relative to the right channel output signal, such function having a rapid rate-of-change of phase equal to 90 degrees per octave between the stereo channels to a maximum of 180 degrees at 300 Hz.

Figure 4:
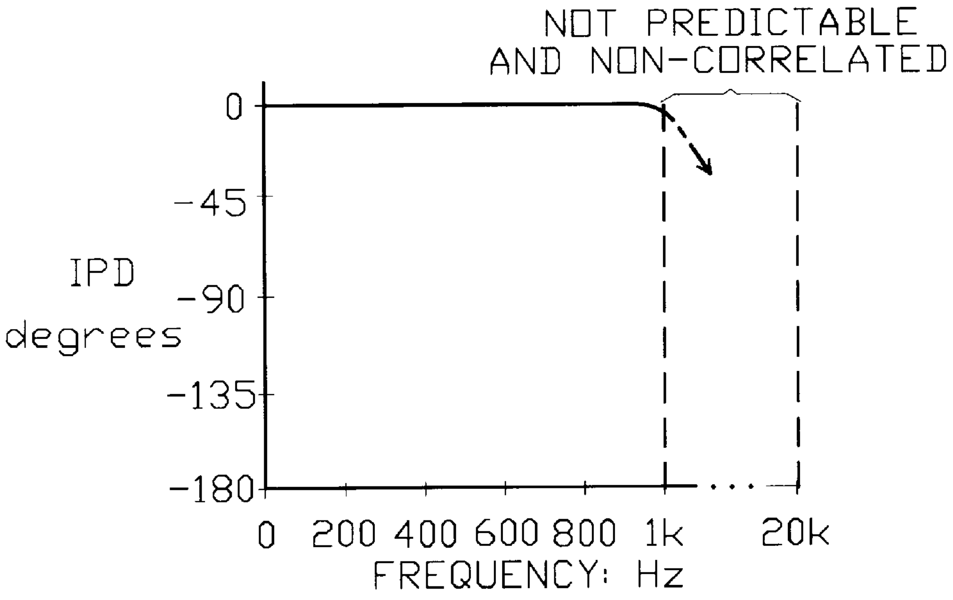
FIGS. 4–5 are graphs approximating corrected interaural phase differences provided by the signal processes of the present invention as measured at the left and right side seat positions respectively in an automobile.

FIG. 4 is a graph approximating the corrected interaural phase difference provided by the signal processes of the present invention, measured at the right ear relative to the left ear, for a listener in an automobile at the left side seat position, the curve being derived by subtracting the curve shown in FIG. 3 from the curve shown in FIG. 1.

Figure 5:
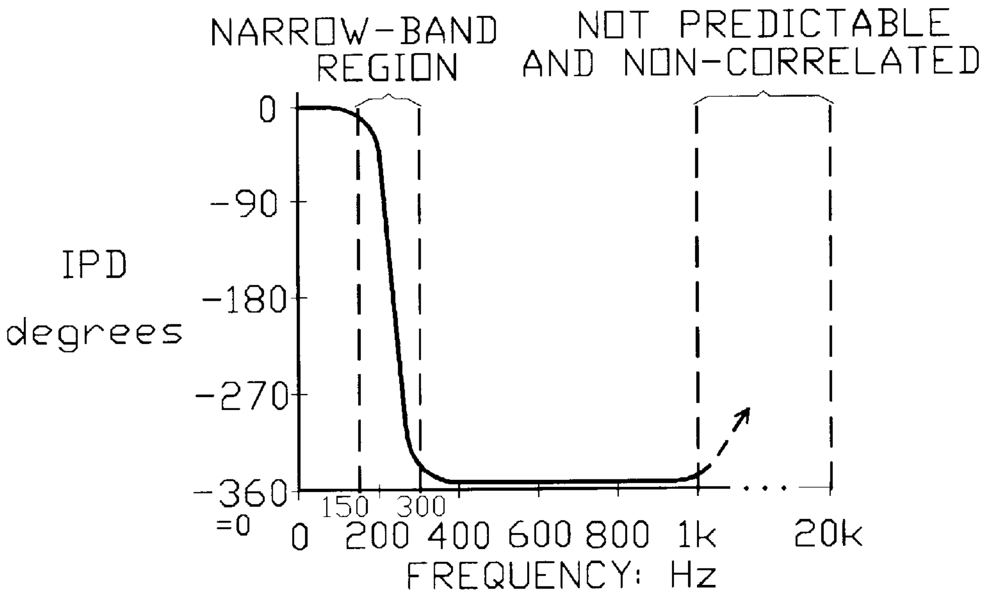

FIG. 5 is a graph approximating the corrected interaural phase difference provided by the signal processes of the present invention, measured at the right ear relative to the left ear, for a listener in an automobile at the right side seat position, said curve derived by subtracting the curve as shown in FIG. 3 from the curve as shown in FIG. 2.

Figure 4A:
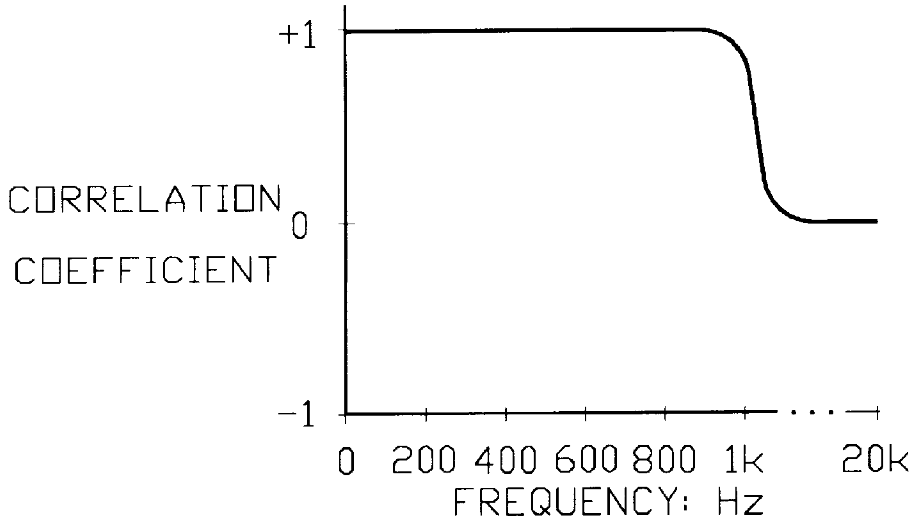

FIG. 4A is a graph representing a conversion of corrected interaural phase difference for a listener in an automobile at the left side seat position (FIG. 4) to corrected phase correlation, measured at the right ear relative to the left ear, for the same listener.

Figure 5A:
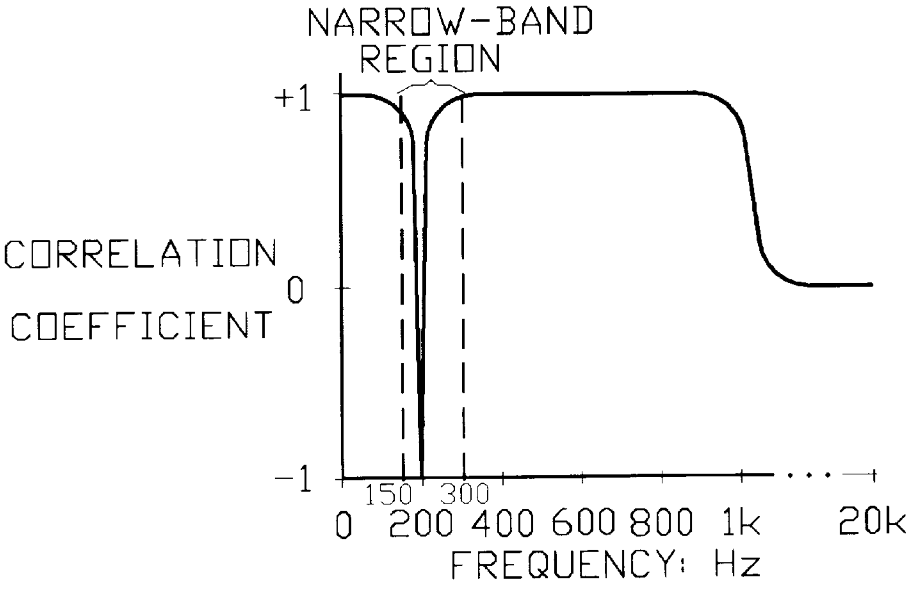

FIG. 5A is a graph representing a conversion of corrected interaural phase difference for a listener in an automobile at the right side seat position (FIG. 5) to corrected phase correlation, measured at the right ear relative to the left ear, for the same listener.

Figure 6:
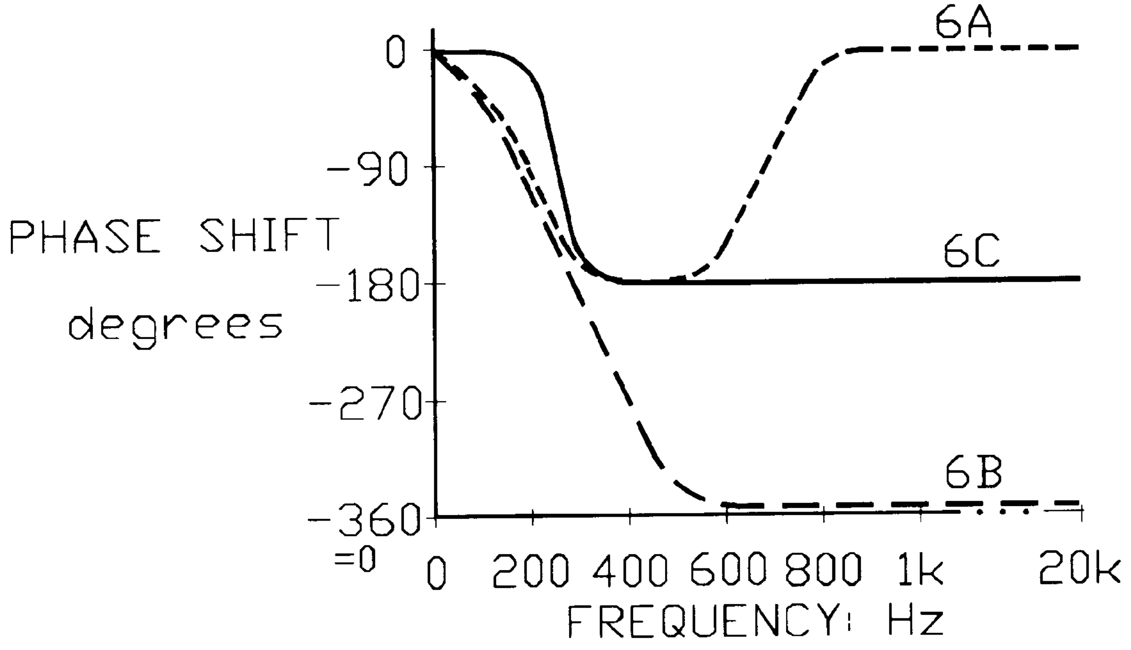
FIG. 6 is a graph representing the approximate phase shift between the left and right channels for two examples of prior art stereophonic image enhancement circuits for use in automobiles, compared to the corresponding phase shift function of the present invention (FIG. 3).

FIG. 6 depicts three curves: curves 6A and 6B are graphs which, to the best of the inventor's understanding, approximate the phase shift functions between left and right channels corresponding to three examples of prior art stereophonic image enhancement circuits for use in automobiles. Curve 6C depicts the correcting phase shift function of the present invention (FIG. 3) as a comparative reference with respect to curves 6A and 6B depicting the prior art.

Figure 7:
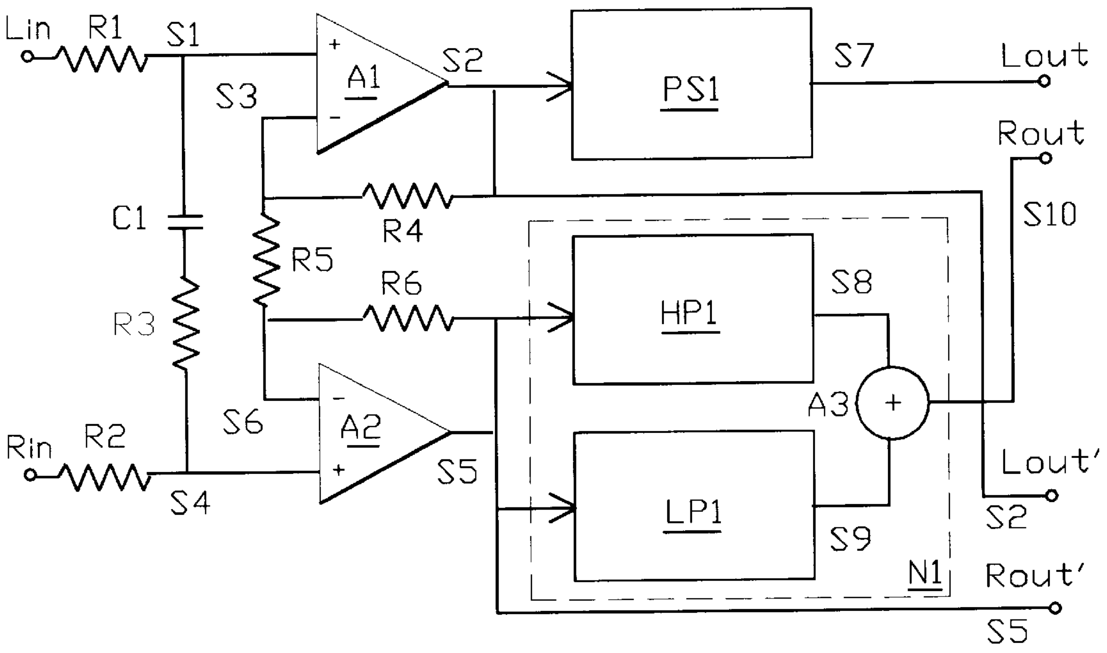
FIG. 7 is a block diagram of a signal processing circuit in accordance with the present invention in a preferred embodiment.

FIG. 7 is a block diagram of the preferred embodiment of the present invention. A left stereo source signal from terminal Lin is applied through resistor R1 to the non-inverting input of op-amp A1. A right stereo source signal from terminal Rin is applied through resistor R2 to the non-inverting input of op-amp A2. A circuit branch with capacitor C1 in series with resistor R3 connects between the non-inverting inputs of op-amps A1 and A2, thereby summing the left and right input signals at the non-inverting inputs, at and above an upper-midrange region where the reactance of C1 is equal to or less than the resistance of R3, thus creating left and right input signals S1 and S4 at the A1 and A2 non-inverting inputs respectively. Feedback resistor R4 connects between the output and the inverting input of A1, and feedback resistor R6 connects between the output and the inverting input of A2. Resistor R5 connects between the inverting inputs of A1 and A2, thereby differentially coupling, with a fixed attenuation, the left and right input signals thus creating left and right differential input signals S3 and S6 at the inverting inputs of A1 and A2 respectively. The above described differential coupling serves to derive stereophonic difference signal components, and to mix such components in an out-of-phase relationship with left and right stereo signal components at the outputs of A1 and A2, thereby providing left and right difference-conditioned signals S2 and S5 at the outputs of A1 and A2 respectively, for spatial enhancement. The above described summing provided by C1 and R3, however, serves to decrease difference signal components at and above the upper-midrange region. It follows that the aforementioned enhancement declines at and above the upper-midrange region, at which frequencies human hearing is not sensitive to phase related spatial cues and also at which frequencies an enhancement of difference signal components of recorded reverberation sound fields degrades perceived stereophonic imaging. Such enhancement declines at and above the upper-midrange region, therefore, provides optimum spatial enhancement without degradation of stereophonic imaging. This portion of the circuitry in the preferred embodiment of the present invention is disclosed by the present inventor in U.S. Pat. No. 5,400,405.

Signal S5 is simultaneously applied to the inputs of third-order high-pass filter HP1 and third-order low-pass filter LP1 having substantially equal cut-off frequencies in a lower midrange region. The low-pass filtered signal S8 at the output of HP1 and the high-pass filtered signal S9 at the output of LP1 are applied as inputs to adder A3, which thus provides as the sum of S8 and S9 a right image-conditioned signal S10. Filters HP1, LP1 and adder A3 form a summed filter network N1 that introduces a rapid rate-of-change 360 degree maximum phase shift.

S2 is applied to the input of first-order phase shifter PS1 that introduces a 180 degree maximum phase shift, thereby constituting left phase-conditioned signal S7. The 180 degree maximum phase shift produced by PS1 partially offsets the 360 degree maximum shift produced by N1 as measured differentially between the stereo channels, thereby resulting in a maximum phase shift of 180 degrees between the stereo channels typically occurring at substantially 300 Hz. The rate-of-change of such phase shift between the stereo channels, however, is predominantly determined by the rapid rate-of-change of phase shift provided by summed filter network N1, thus providing a rapid rate-of-change 180 degree maximum phase shift between the stereo channels whereby each of the previously described objectives of the present invention are met.

Third-order high-pass filter HP1 may be substituted by an alternative order high-pass filter, third-order low-pass filter LP1 may be substituted by an alternative order low-pass filter, the outputs of HP1 and HP2 may be added in one of an in-phase and out-of-phase manner, and first-order phase shifter PS1 may be substituted by a higher than first-order phase shifter; any of the foregoing substitutions are within the general principles taught by the present invention.

The main output signals, S9 and S10, which are difference-conditioned as well as phase-conditioned are provided at output terminals Lout and Rout, which typically provide input to left and right front amplifiers driving corresponding speakers in the front region of the vehicle so as to provide both spatial-enhancement and image-enhancement effects in the front region.

The second pair of output signals S2 and S5, which are difference-conditioned but not phase-conditioned, are delivered at output terminals Lout' and Rout', which typically provide input to left and right rear amplifiers driving corresponding speakers in the rear region of vehicle, thus providing the spatial-enhancement effect in the rear region.

Alternatively, a rear mode switch may be provided to allow the rear amplifiers and speakers to receive input as selected from either the difference-enhanced signals (S2, S5) or the difference-enhanced and phase-enhanced signals (S9, S10) as provided in the front region, thus providing the spatial-enhancement in the rear region, with the image-enhancement as a switch-selectable option.

Figure 8:
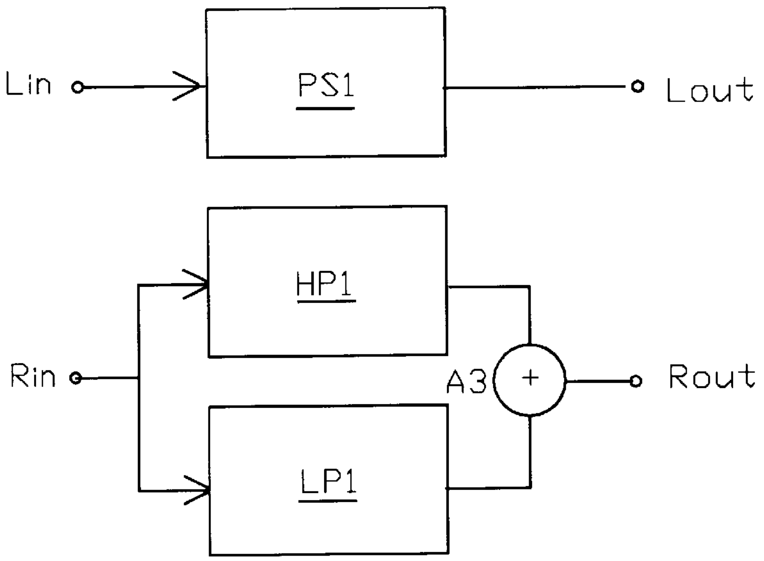
FIG. 8 is a block diagram of a simplified embodiment of the present invention.

FIG. 8 is a block diagram of a simplified embodiment of the present invention, which is the same as the circuit shown in FIG. 7 with the exception that the above described differencc-conditioning function for spatialization is not included due to the elimination of components R1, R2, R3, R4, R5, R6, C1, A1, A2 and SW1. The left stereo input signal Lin is applied to the input of PS1 which thus provides as output the left stereo output signal Lout. The right stereo input signal Rin is simultaneously applied to the inputs of filters HP1 and LP1, whose outputs are summed in adder A3 to provide the right stereo output signal Rout.

The above described signal processes of the present invention may be implemented by functionally equivalent analog and DSP circuits, which, due to their equivalence, conform to the principles taught by the present invention. In particular, digital circuitry may be used to implement the present invention by providing a rate-of-change of phase equal to at least 90 degrees per octave to a maximum of substantially 180 degrees between the stereo channels at a midrange frequency; and, may further be used to implement the present invention by providing equalized stereo difference signals, in the manner described above, prior to and in combination with the above described phase shift function of the present invention. The application of a portion of such phase shift function to one stereo channel and the remaining portion of the phase shift function to the remaining channel, such that the phase shift function exists differentially between the stereo channels, is functionally equivalent to such phase shift function applied to one stereo channel only and therefore conforms to the principles taught by the present invention.

This invention may be embodied and practiced in other specific forms without departing from the spirit and essential characteristics thereof. The present embodiments therefore are considered in all respects as illustrative and not restrictive. The scope of the invention is indicated by the appended claims rather than by the foregoing description. All variations, substitutions, and changes that come within the meaning and range of equivalency of the claims therefore are intended to be embraced therein.

What is claimed is:

1. A stereo signal processing system, in a vehicular sound system having first and second stereo channel signal paths receiving stereo source signals, for enhancing stereo image focus and sound stage in a symmetrical manner for listeners located at right and left locations in a vehicle, comprising:

a summed filter network, inserted in at least one of the stereo channel signal paths, configured and arranged to introduce a rapid rate-of-change of phase shift, equal to at least 90 degrees per octave approaching a maximum of approximately 180 degrees, between the stereo channels at approximately 300 Hz said summed filter network comprising:

a low-pass filter of order n and having a cut-off frequency approximating 300 Hz, inserted in a first branch of the first stereo channel signal path;

a high-pass filter of order n' and having a cut-off frequency approximating 300 Hz, inserted in a second branch of the first stereo channel signal path; and a summing device, receiving input from said low-pass filter in the first branch and from said high-pass filter in the second branch, configured and arranged to provide as output a summed filtered signal;

said stereo signal processing system further comprising a phase shifter of an order n" inserted in the second stereo channel signal path so as to constitute, along with said summed filter network, a phase-conditioning processor block providing a pair of phase-conditioned stereo signals as a main output signal for purposes of image-enhancement of stereo sound within the vehicle.

2. The stereo signal processing system as defined in claim 1 wherein said low-pass filter of order n is a third-order low-pass filter, said high pass filter of order n' is a third-order high-pass filter, and said phase shifter of order n" is a first-order phase shifter.

3. The stereo signal processing system as defined in claim 1 wherein the pair of phase-conditioned stereo signals from said phase-conditioning processor block are applied as input to a pair of corresponding front channel amplifiers driving corresponding front channel speakers in the vehicle for purposes of image-enhancement in a front region of the vehicle.

4. The stereo signal processing system as defined in claim 1 further comprising:

a difference-conditioning processor block, receiving as input the stereo source signals, inserted in the first and second stereo channel signal paths, configured and arranged to mix derived equalized difference signals in an out-of-phase manner with the stereo source signals so as to provide a pair of difference-conditioned stereo signals as input to the phase-conditioning processor block, for purposes of adding spatial enhancement.

5. The stereo signal processing system as defined in claim 4 wherein the pair of difference-conditioned stereo signals are also applied as input to a pair of corresponding rear channel amplifiers driving corresponding rear channel speakers in the vehicle for purposes of spatial-enhancement in a rear region of the vehicle.

6. The stereo signal processing system as defined in claim 4 further comprising:

a rear channel selector switch configured and arranged to enable user selection of rear channel stereo signals to be applied as input to a pair of corresponding rear channel amplifiers driving corresponding rear channel speakers in the vehicle, selected as a choice between (1) the pair of difference-conditioned stereo signals from the difference-conditioning circuit block, for purposes of spatial enhancement, and (2) the output signals from said phase-conditioning processor, being phase-conditioned in addition to being difference-condtioned, for purposes of image enhancement in addition to spatial enhancement in the rear region of the vehicle.

7. The stereo signal processing system as defined in claim 2 further comprising a summing circuit configured and arranged to provide as output a center channel signal derived as a sum of the stereo source signals;

whereby a center speaker, deployed generally on a longitudinal axis of the vehicle located centrally between the right and left passenger locations, may be driven by an audio amplifier, receiving the center channel signal as input.

8. The stereo signal processing system as defined in claim 7 further comprising a low-order high-pass filter configured and arranged to high-pass filter the center channel signal.

* * * * *